(No Model.) 2 Sheets—Sheet 2.
A. PONTEN & J. V. SKOGLUND.
APPARATUS FOR CENTRIFUGAL SEPARATION OF COMPOUND LIQUIDS.
No. 528,690. Patented Nov. 6, 1894.
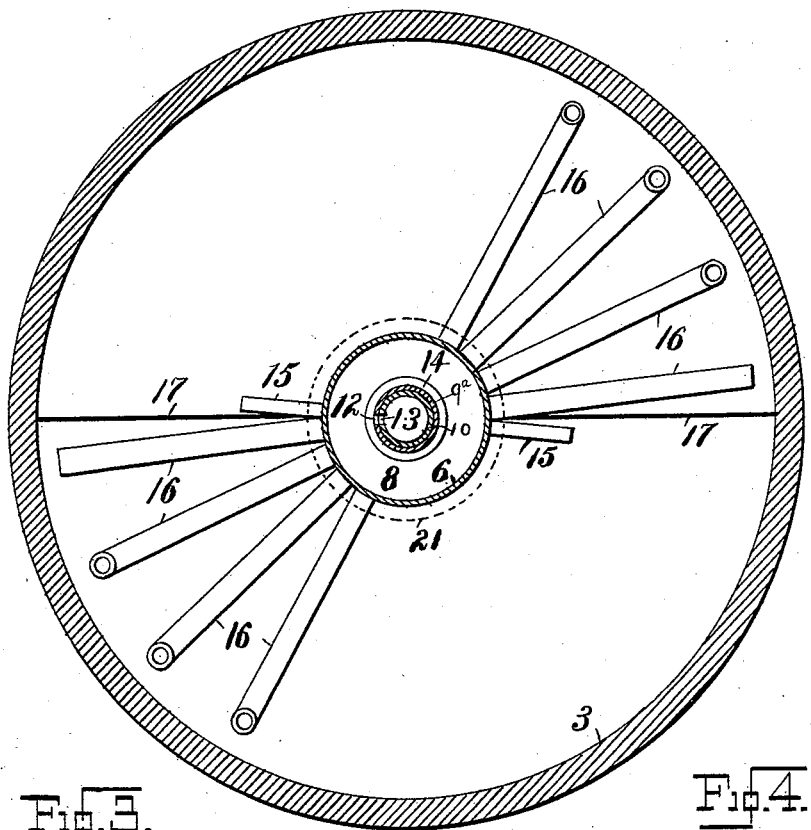
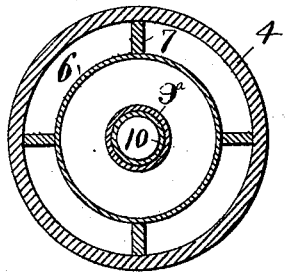
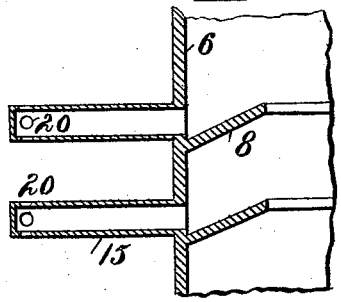
Witnesses
Inventors

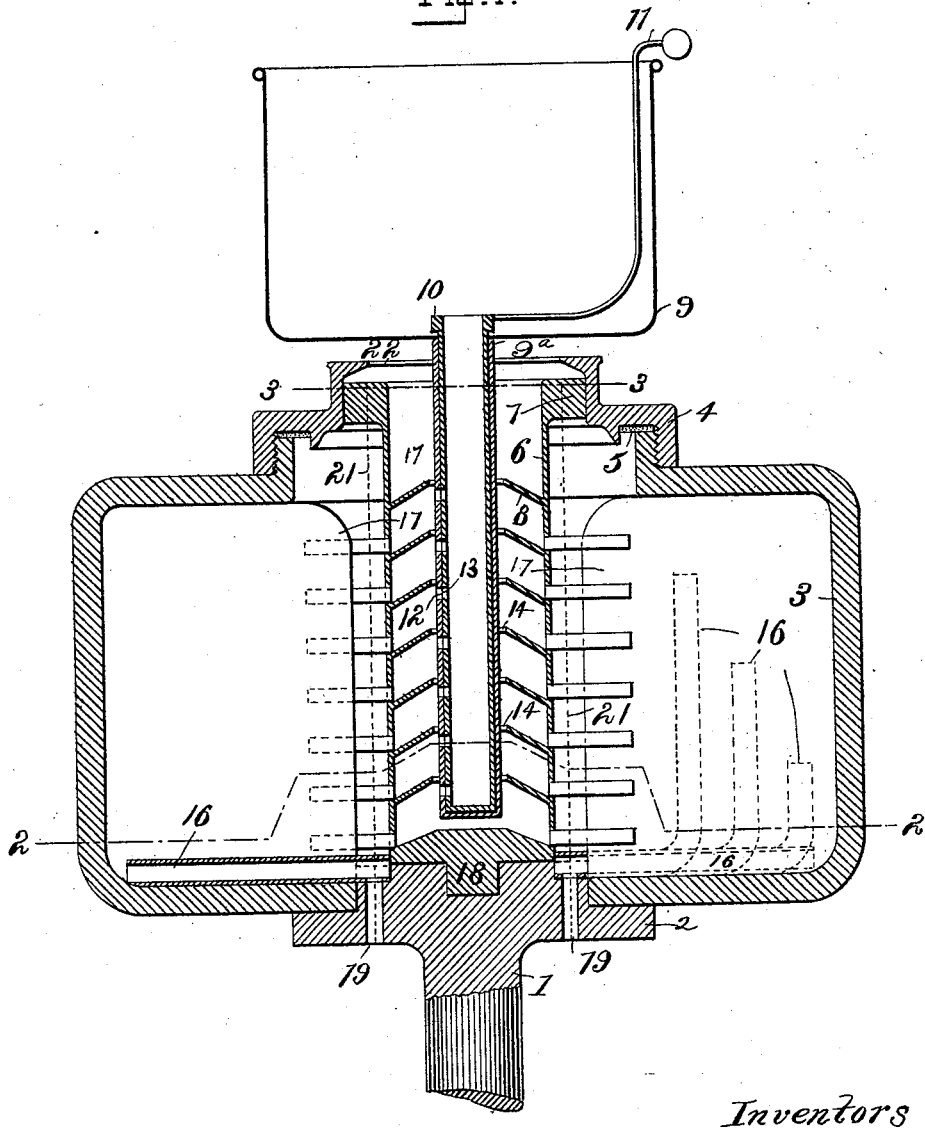

UNITED STATES PATENT OFFICE.

ANDERS PONTEN AND JEAN VILHELM SKOGLUND, OF NEW YORK, N. Y.

APPARATUS FOR CENTRIFUGAL SEPARATION OF COMPOUND LIQUIDS.

SPECIFICATION forming part of Letters Patent No. 528,690, dated November 6, 1894.

Application filed May 23, 1893. Serial No. 475,203. (No model.)

*To all whom it may concern:*

Be it known that we, ANDERS PONTEN and JEAN VILHELM SKOGLUND, subjects of the King of Sweden and Norway, residing at New York, in the county of New York and State of New York, have invented certain new and useful Improvements in Apparatus for the Centrifugal Separation of Compound Liquids; and we do hereby declare the following to be a full, clear, and exact description of the invention, such as will enable others skilled in the art to which it appertains to make and use the same.

Our invention relates to that class of machines known as centrifugal liquid separators, in which compound liquids of different specific gravities,—such as whole milk,—are continuously separated into their constituent liquids,—such as skim milk and cream,—by the action of centrifugal force produced by causing the compound liquids to rotate rapidly in an imperforate vessel or bowl running at a high velocity.

The object of our invention is to increase the separating capacity of the rotating vessel so that a machine of given size, driven by a given expenditure of power, will separate more milk in a given time than it would if constructed and operated on principles heretofore employed. At the same time we have succeeded in simplifying the construction of the separator so that it can be easily cleaned and kept in order by the operator.

In previously constructed continuously acting centrifugal liquid separators, especially milk separators, it has been the practice to supply the compound liquids or whole milk at one end of the revolving drum or bowl. The liquid is then left to distribute itself in the bowl in the best manner possible without the aid of any special appliance or contrivance for accomplishing such distribution. The lighter cream or fat particles start off toward the axis of rotation while the heavier liquid or skim-milk moves toward the outer wall of the drum or bowl and finds its way out of the bowl through the passages provided for that purpose. It is evident that the milk strives to take the shortest way from where it enters the separating chamber to the discharge opening at the outer wall of the bowl and as a consequence of this only a small portion of the separating space or chamber of the revolving bowl is utilized.

In order to accomplish the object of our invention we aim to utilize every available part of the separating space in the revolving bowl or drum by uniformly distributing the compound liquid or whole milk throughout the entire bowl and practically accomplish this by subdividing the supply of whole milk along the axis of rotation, through tubes conveying the whole milk from the receiving apparatus and terminating at a suitable distance beyond the inner surface of the rotating liquid. For this reason we let in the whole milk at a number of places situated in different planes perpendicular to the axis of rotation. At each and every point of supply the separation commences instantly and each separated particle strives to travel the shortest way along the plane of rotation to the place of discharge, the skim milk traveling toward the circumference of the bowl while the cream goes toward the center of rotation.

Any number of discharge passages for the skim milk may be used, the initial opening of each or of several of which may also be located in different planes of rotation in order to still more completely utilize the entire separating space of the bowl and at the same time avoid all disturbing currents which otherwise would be caused by the moving skim milk particles. In utilizing the whole separating space of the bowl it follows as a consequence that each and every milk particle travels through the bowl at a reduced rate of speed or in other words the speed with which the milk particles travel toward the circumference of the bowl is considerably reduced and becomes more regular and the fat particles which have to move in an opposite direction (toward the center) are less retarded by the outward moving skim milk and the mixed liquids or whole milk is accordingly separated both faster and better.

Other subsidiary points of novelty and advantages in our invention will appear in the subjoined claims and detailed description of the preferred form of apparatus illustrated in the accompanying two sheets of drawings.

Figure 1, is a vertical central section of the essential parts of our improved apparatus. Fig. 2, is a horizontal section on broken line 2,—2, of Fig. 1. Fig. 3, is a horizontal section on line 3,—3, of Fig. 1. Fig. 4, is a detailed view showing a modified form of the radial supply tubes.

Throughout the specification like reference figures refer to like parts.

1, represents the main shaft which is vertical and upon which the revolving parts of the separator are supported. 2, is a flange upon the upper end of said shaft to which the hollow casing 3, forming the separating chamber is fastened. This casing is made either in the shape of the frustum of a cone, or in the shape of a cylinder, with its corners rounded as shown.

4, is a cap which screws on to the top of the casing 3, and 5, is the packing ring which makes the fluid tight joint between the two.

6, is a removable receiving apparatus occupying the center of the casing 3, and supported from the cap 4, by a suitable number of wings 7, as is best shown in Fig. 3. Within the receiving cylinder 6, is a number of annular shaped partitions 8, which divide the space within the receiving apparatus into a number of circular chambers or compartments.

Supported above the rotating parts of the separator by any convenient frame work, not shown in the drawings, is the supply tank 9, into which the whole milk or other mixed liquid may be poured. Depending from the center of the bottom of said supply tank is the supply tube 9ª, which is concentric with the axis of rotation of the casing 3, and passes through the circular openings left in the partitions 8. The tube 9ª, does not touch the partitions 8, an annular space 14, being left between them, as is best shown in Fig. 2. Opposite each compartment in the receiving apparatus 6, the tube 9ª has one or more openings 12, for separately supplying the compound liquid to each compartment of said receiving apparatus. Within the supply tube 9ª, is an inner tube 10, which fits it closely and which can be given either a motion of rotation or an endwise sliding motion by means of the projecting handle 11, which extends beyond the supply tank 9, so that it can be grasped by the operator. In the supply tube 9ª, are any desired number of perforations 12, which open into the separate compartments formed by the partitions 8. In the inner tube 10, is a corresponding number of perforations 13, which register exactly with the perforations 12, when the inner tube is in the proper position. By shifting the inner tube by means of the handle 11, in any direction, the perforations 12, will evidently be more or less closed and the flow of liquid through them diminished to a corresponding extent.

In the receiving apparatus 6, and opening out of the various compartments therein formed by the partitions 8, is a number of radial supply tubes 15, which are perpendicular to the axis of rotation. At the bottom of the separating chamber, formed by the hollow casing 3, is a number of discharge tubes 16, and which have their inner ends terminating at different heights or in different planes of rotation, which communicate with the discharge orifices 19. The bottom portion of the receiving apparatus 6, also serves as a support therefor, having an extension 18, which fits into a hole in the flange of the spindle 1. In the separating chamber is a number of vanes 17, which extend from the circumference of the chamber to a point inside of the ends of the radial tubes 15. These vanes are parallel to the axis of rotation and extend nearly to the inner wall of the separating chamber as shown in Fig. 1.

The radial supply tubes 15, are shown with their outer ends open in Figs. 1 and 2, but may be closed at the end, as shown in Fig. 4, and have a number of side openings 20, which in fact is the preferred form.

The mode of operation of our invention is as follows: A very high speed of rotation is given to shaft 1, and with it the casing 3, and its co-operating elements, which form the separating chamber or bowl. The mixed liquids, such as whole milk, are poured into the supply tank 9, which does not revolve, and passing down the supply tube 10, are discharged through the perforations, 12, with a greater or less rapidity depending upon the position of the inner tube 10, which may be controlled by the handle 11. The liquids passing out in this manner are supplied in a divided form to the compartments of the receiving apparatus 6, and pass out from there through the radial tubes 15, into the separating chamber. The passage through the radial tubes 15, and the subsequent control of the fluid by the vanes 17, impart to the liquid the same speed of rotation as the casing 3 has. The high speed of rotation produces a tremendous centrifugal force which acts both upon the particles of cream and the particles of skim milk in the separator, but as the particles of skim milk are the heavier in each case, the centrifugal force generated by their rotation is much greater than that generated by the lighter particles of cream, and consequently the skim milk passes to the circumference of the separating chamber while the particles of cream are crowded toward the inner surface of the separated liquid, shown by dotted lines 21 in Figs. 1 and 2. The skim milk passes out through the discharge tubes 16, and discharge orifices 19, into any annular vessel which may be arranged to receive it. In the same way the layer of cream is forced upward between the wings 7, and overflows the inner edge 22, of cap 4, into a proper annular receptacle provided for it. As will be seen, the line of travel of each particle of the compound liquid from the receiving apparatus to the point in the separating chamber at which the separation begins, is direct; also after the separating action has set up there is a straight current in either direction for the constituent elements of each particle; one toward the circumference of the chamber for the heavier liquid and the other toward the inner surface 21, of the revolving mass of liquid for the lighter liquid. The layer of cream collected at the inner surface 21, is not disturbed by the inflow of the divided currents of supply for the reason that these latter are carried beyond it by the tubes 15.

As will be seen, this apparatus carries out the improved method devised by us in that the inflowing current is divided into different subcurrents of supply, each of which has its separate plane of rotation and in which the process of separation can be immediately and powerfully brought into operation without its disturbance by other currents or eddies of any kind.

Of course various changes can be made in the construction of our apparatus without departing from the spirit of our invention.

Having, therefore, described our invention, what we claim as new, and desire to protect by Letters Patent, is—

1. In a centrifugal separator for liquids of different specific gravities, the combination with the separator bowl having separate discharges for the different materials, of a supply device for the compound liquid, and numerous tubes leading the supply liquid into the mass of liquid within the separator to points beyond or outside the inner well thereof so that such liquid is supplied in numerous planes of rotation without disturbing the inner wall of the material being separated, substantially as described.

2. In a centrifugal separator the combination of the revolving separating chamber, the central receiving apparatus which has a number of compartments and a number of inlets from each of said compartments to the separating chamber, which inlets terminate beyond the inner surface of the liquid under treatment and are located in different planes of rotation, together with separate discharge orifices for the separated liquid, substantially as described.

3. In a centrifugal liquid separator, the combination of the revolving separating chamber, the central supply tube, the receiving apparatus, partitions in said receiving apparatus which separate the compound liquids into different planes of rotation, and radial tubes which discharge the liquid from the receiving apparatus into the separating chamber, together with separate discharge orifices for each of the constituent liquids, substantially as described.

4. In a centrifugal liquid separator, the combination of the revolving separating chamber, the central supply tube, the receiving apparatus, partitions in said receiving apparatus which separate the compound liquids into different planes of rotation, and radial tubes which discharge the liquid from the receiving apparatus into the separating chamber, together with the separate discharge orifices for each of the constituent liquids, vanes parallel to the axis of rotation, extending from the walls of the separating chamber to a point inside of the outer ends of the radial tubes, substantially as described.

5. In a centrifugal liquid separator, the combination of the revolving separating chamber, with its co-operating elements, the receiving apparatus with its various compartments, the supply tank, the central supply tube, with several openings, leading from the supply tank to the different compartments of the receiving apparatus, and the means whereby the size of said openings may be increased or diminished, substantially as described.

6. In a centrifugal liquid separator, the combination of the revolving separating chamber with its co-operating elements receiving apparatus with its various compartments, the stationary supply tank, the central supply tube, with several perforations, leading from the tank to the different compartments of the receiving apparatus, the inner tube having perforations which register with those of the supply tube, and the projecting handle extending from said inner tube to a point outside of the supply tank and by which said inner tube may be given a rotating or endwise motion so as to regulate to a greater or less extent the accuracy with which its perforations register with those of the supply tube, substantially as described.

7. In a centrifugal liquid separator, the combination of the revolving separating chamber, the central supply tube, the receiving apparatus, partitions in said receiving apparatus which separate the mixed liquids into different planes of rotation, and radial tubes which discharge the liquid from the receiving apparatus into the separating chamber, together with separate discharge orifices for each of the constituent liquids, certain of which discharge orifices (for the heavier liquid) are fed by discharge pipes having their initial openings in different planes of rotation, substantially as described.

8. In a centrifugal liquid separator, the combination of the revolving separating chamber, the central supply tube, the receiving apparatus, partitions in said receiving apparatus which separate the liquids to be treated into different planes of rotation, radial tubes which discharge the liquid from the receiving apparatus into the separating chamber, said tubes having their outer ends closed but being provided with holes in their sides near said outer ends, and separate discharge orifices for each of the constituent liquids, substantially as described.

In testimony whereof we affix our signatures in presence of two witnesses.

ANDERS PONTEN.
JEAN VILHELM SKOGLUND.

Witnesses:
  G. BERGENDORF,
  THEODORE DURRANT.